(12) United States Patent
Benderradji et al.

(10) Patent No.: US 10,502,087 B2
(45) Date of Patent: Dec. 10, 2019

(54) ASSEMBLY FOR CONTROLLING VARIABLE PITCH VANES IN A TURBINE ENGINE

(71) Applicant: Safran Aircraft Engines, Paris (FR)

(72) Inventors: Kamel Benderradji, Moissy-Cramayel (FR); Blaise Bergon, Moissy-Cramayel (FR); Alain Marc Lucien Bromann, Moissy-Cramayel (FR); Suzanne Madeleine Coustillas, Moissy-Cramayel (FR); Lilian Yann Dumas, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 172 days.

(21) Appl. No.: 15/645,504

(22) Filed: Jul. 10, 2017

(65) Prior Publication Data

US 2018/0016931 A1    Jan. 18, 2018

(30) Foreign Application Priority Data

Jul. 12, 2016   (FR) ...................... 16 56693

(51) Int. Cl.

| F01D 17/16 | (2006.01) |
|---|---|
| F01D 17/14 | (2006.01) |
| F01D 9/04 | (2006.01) |
| F01D 17/26 | (2006.01) |
| F04D 29/56 | (2006.01) |

(52) U.S. Cl.
CPC ........... *F01D 17/141* (2013.01); *F01D 9/041* (2013.01); *F01D 17/162* (2013.01); *F01D 17/26* (2013.01); *F04D 29/563* (2013.01); *F05D 2220/323* (2013.01); *F05D 2260/50* (2013.01); *Y02T 50/671* (2013.01)

(58) Field of Classification Search
CPC ........ F01D 17/16; F01D 17/162; F01D 17/20; F01D 17/00; F01D 17/10; F01D 17/12; F01D 17/14; F04D 27/0246; F04D 27/002

See application file for complete search history.

(56) References Cited

U.S. PATENT DOCUMENTS

| 3,841,788 A | 10/1974 | Sljusarev et al. | |
|---|---|---|---|
| 3,861,822 A * | 1/1975 | Wanger ................. | F01D 17/162 415/147 |
| 4,867,635 A * | 9/1989 | Tubbs .................... | F01D 17/162 415/159 |
| 2014/0286745 A1 | 9/2014 | Rusovici | |

FOREIGN PATENT DOCUMENTS

| FR | 2 902 454 A1 | 12/2007 |
|---|---|---|
| JP | 2010-001821 A | 1/2010 |
| WO | WO 2014/070630 A1 | 5/2014 |

* cited by examiner

*Primary Examiner* — Richard A Edgar
(74) *Attorney, Agent, or Firm* — Blank Rome LLP

(57) ABSTRACT

An assembly for controlling variable pitch vanes in a turbine engine, the assembly comprising an actuating ring surrounding a casing of the turbine engine and connected by rods to variable pitch vanes. The actuating ring is configured to rotate around the casing. The assembly further includes a passive element including a first end sliding connected to a second end. The first end is connected by a sliding pivoting link on the actuating ring, and the second end is connected by a ball-joint link to the casing.

11 Claims, 3 Drawing Sheets

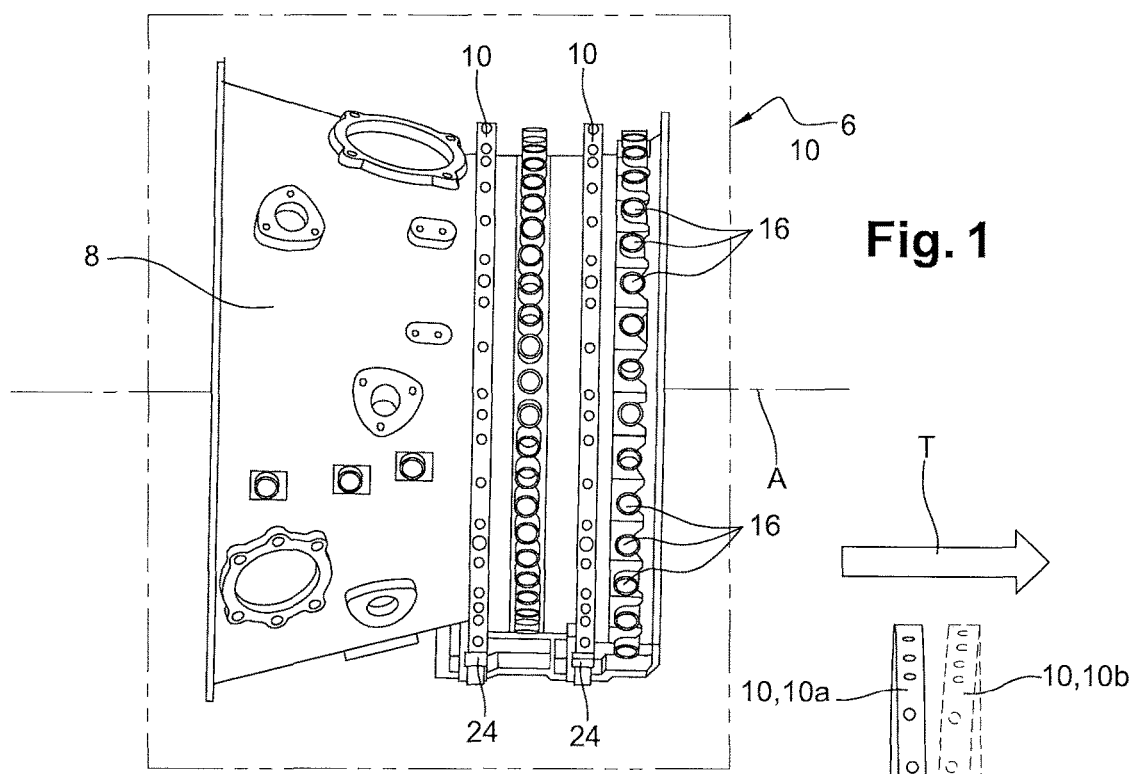
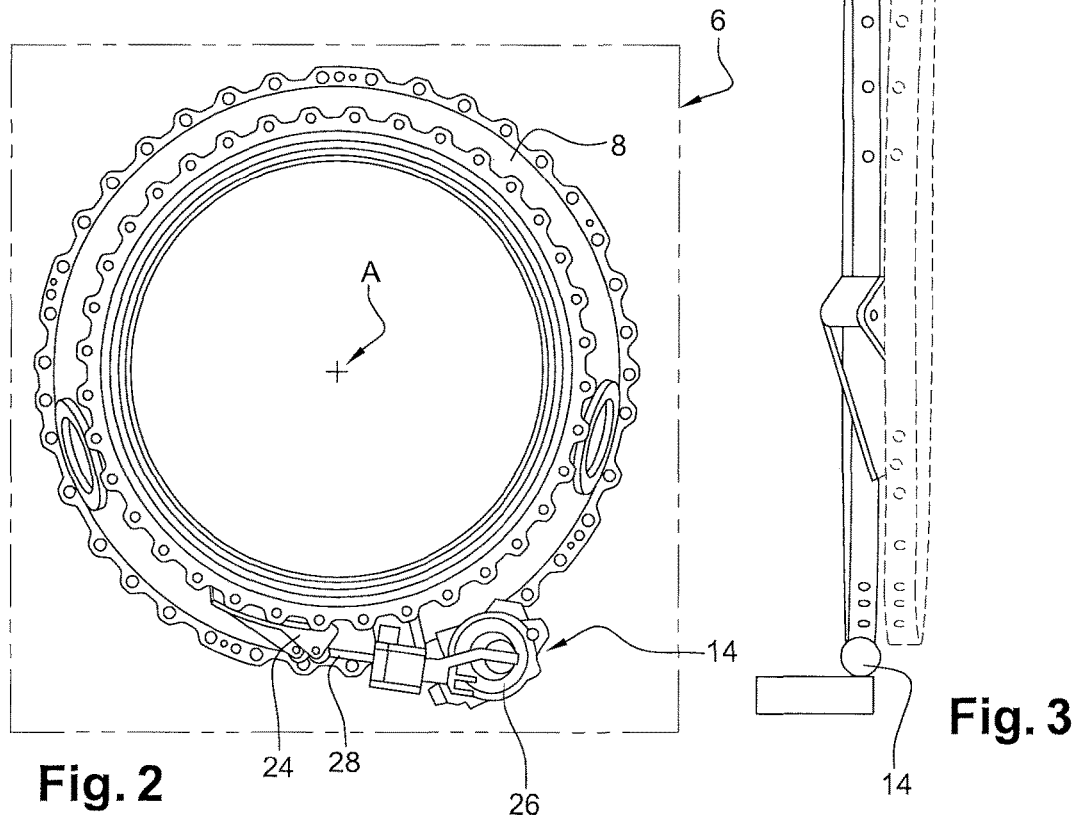
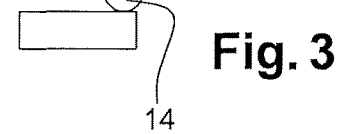

ASSEMBLY FOR CONTROLLING VARIABLE PITCH VANES IN A TURBINE ENGINE

BACKGROUND OF THE INVENTION

1. Field of the Invention

The present invention relates to an assembly for a turbine engine comprising variable pitch vanes in addition to a turbine engine comprising said assembly.

2. Description of the Related Art

Conventionally, an assembly for variable pitch vanes comprises a shroud in which the vanes are mounted for rotation around their own axis, wherein the orientation of the vanes is known as the pitch.

To control the pitch of the blades, it is known to use an actuating ring coaxial to the shroud around a longitudinal axis of the turbine engine and connected to the pivot of each of the vanes by rods integral with said vane pivots. A driving means rotates the ring, around the shroud, which pivots the rods around their respective pivots, thereby allowing an angular pitch of the blades in relation to the air flow circulating inside the shroud.

Due to the rigidity of the rods, the movement of the ring corresponds to the combination of a rotation around the longitudinal axis, induced by the driving means and a translation along the same longitudinal axis.

When the assembly is equipped with only a single driving means, the rotational movement tends to generate axial deflection of the ring, i.e. twisting of the portion of the ring opposite the driving means around a radial axis. This deflection must be prevented at all costs, since it results in greater displacement of the rods of the vanes located in this portion, resulting in a different angular pitch for the vanes.

To reduce the axial deflection, it would be possible to add a second driving means positioned circumferentially opposite the first driving means.

However, the presence of two driving means offers a number of disadvantages. Indeed, a second driving means adds an additional mass that results in an increase in fuel consumption of the turbine engine. Furthermore, the presence of a second driving means increases the overall dimensions of the variable pitch assembly contrary to the trend followed by the turbine engine manufacturers, which involves reducing the dimensions of the components in order to produce a turbine engine with the least possible impact on aerodynamic drag. Finally, addition of a second driving means results in greater and more complex maintenance since the components of the driving means are moving parts that undergo wear over time.

SUMMARY OF THE INVENTION

The invention more particularly aims at providing a simple, efficient and cost-effective solution to this problem.

For this purpose, the invention provides for an assembly, particularly for controlling variable pitch vanes in a turbine engine comprising an actuating ring surrounding a casing of the turbine engine and connected by rods to variable pitch vanes in addition to a driving means for rotating the actuating ring around the casing, wherein this assembly is characterised in that it comprises a slidingly connected passive element, one end of which is connected by a sliding pivoting link on the actuating ring and a second end is connected by a ball-joint link on the casing.

According to the invention, the passive cylinder allows to restrict the axial deflection of the actuating ring when the latter is moved in rotation by the driving means, thereby ensuring identical pivoting of all the vanes and hence an identical angular pitch of the vanes. In practice, the two modes of linking the ends of the cylinder to the actuating ring and to the casing allow to restrict twisting of the ring opposite the cylinder, inducing axial guidance to displacement of the ring at this point.

According to another characteristic of the invention, the passive element is arranged circumferentially opposite the driving means of the ring. It is thus possible to substantially reduce the mass of the assembly according to the invention versus an assembly using two driving means as in the prior art while avoiding axial deflection of the actuating ring.

Advantageously, the passive element comprises a body bearing the first end and in which a rod bearing the second end is mounted for translational movement.

According to one aspect, the first end of the passive element is mounted for rotation and translational movement around and according to a radial axis in a yoke of a first support element integral with the actuating ring and the second end of the passive element is connected via a ball-joint link to a second support element integral with the casing.

The ball-joint link and the pivoting serve to avoid any hyperstatism of the passive element such that the passive element is able to control the axial displacement of the ring without any risk of breakage and allowing all the pitch values of the variable pitch vanes.

Advantageously, the first support element is arranged downstream (or upstream respectively) from the rods and the second support element is arranged upstream (or downstream respectively) from the rods. This serves particularly to allow the rods to be able to move without any risk of colliding with the support elements.

Preferably, the second end of the passive element can be connected to a flange of the casing to facilitate its mounting.

Advantageously, the passive element is a braking cylinder, a gas cylinder or spring loaded cylinder for example.

The invention also relates to a turbine engine, such as an aircraft turbojet or turboprop engine, characterised in that it comprises at least one assembly as described above.

BRIEF DESCRIPTION OF THE DRAWINGS

The invention will be better understood and other details, characteristics, and advantages of the invention will appear on reading the following description given by way of non-limiting example and with reference to the accompanying drawings, in which:

FIG. 1 is a side view of a turbine engine comprising a casing on which rings for controlling variable pitch vanes and driving means for rotating these rings are mounted;

FIG. 2 is a front view of the turbine engine in FIG. 1;

FIG. 3 is a side view showing a ring during normal movement and in dotted lines, a ring having undergone deflection;

Figure 4:
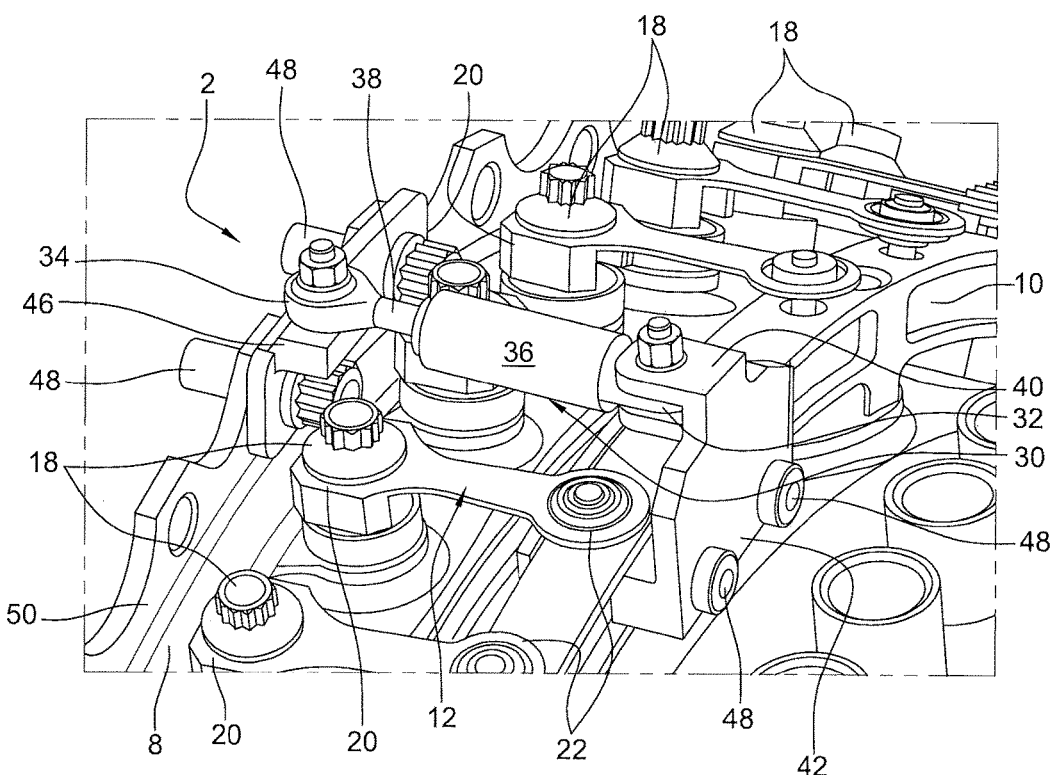
FIG. 4 is a detailed top perspective view of an assembly according to the invention comprising a casing, variable pitch vanes, a vane pitch actuating ring, connected to the vanes by rods and a cylinder in order to restrict the axial displacement of the ring on the casing.

DETAILED DESCRIPTION OF THE
PREFERRED EMBODIMENTS

Illustrated in the figures is an assembly 2, particularly for controlling variable pitch vanes 4 in a turbine engine 6, comprising a casing 8 of the turbine engine 6, an actuating ring 10 surrounding the casing 8 and connected by rods 12 to the variable pitch vanes 4 and a driving means 14 for rotating the actuating ring 10 around the casing 8. Preferably, the casing 8 is annular and has a longitudinal axis A of symmetry and the actuating ring 10 is coaxial with the casing 8 and mounted around the latter. In the example illustrated in the figures and particularly in FIG. 1, two rings 10 are represented; however, reference will only be made to a single ring 10 in the further description, given that all the actuating rings 10 are identical and function in the same manner.

The casing 8 has shafts 16 in which nuts 18 integral with the vanes 4 are fixed, said nuts 18 defining an axis A1 of rotation of the vanes 4 to adjust their pitch.

The rods 12 are integral at a first end 20 with the nuts 18 of the vanes 4, and at a second end 22 with the actuating ring 10. However, it should be explained that the link between the rods 12 and the actuating ring 10 is a ball-joint link permitting a rotational movement between the rods 12 and the actuating ring 10.

Hence, when the actuating ring 10 is driven in rotation by the driving means 14 for rotation, the rods 12 pivot relative to the ring and are forced by their second end 22 to follow the actuating ring 10, such that as a result of their solid attachment to the nuts 18 of the vanes 4, the movement of the rods 12 implies rotation of the vanes 4 around their respective axis A1.

Preferably, the assembly 2 comprises, for each actuating ring 10, a single driving means 14 that comprises in particular a first support 24 integral with an actuating ring 10, a second support 26 integral with the casing 8 and an actuator 28, in the present case a cylinder, mounted for rotation, by both ends, on each of the first support 24 and the second support 26. When the actuator 28 is operated, it induces a rotational movement to the actuating ring 10 around the longitudinal A of the casing 8 which, as explained above, causes rotation of the vanes 4 by means of the rods 12.

It is therefore understood that a single driving means 14 is used for each actuating ring 10. This particularly allows a reduction in the overall dimensions of the assembly 2 and restriction of the weight of this assembly 2.

Reference will now be made to FIG. 3.

Movement of the actuating ring 10 during pitch adjustment of the vanes 4 is then a combination of a rotation around the longitudinal axis A, caused by the driving means 14 and a translational movement T along the same longitudinal axis A, caused by the rods 12 which are non-deformable.

The presence of a single driving means 14 for each ring and the combined movement of the actuating ring 10 subsequently causes deflection of the actuating ring 10. Deflection is defined as uncontrolled deformation of the actuating ring 10; in the present case twisting of the actuating ring 10. It will be noticed, via the illustration of the actuating ring 10 in dotted lines in FIG. 3, that the deflection is maximum in a portion radially opposite the first support 24 integral with the actuating ring 10. This maximum deflection is the result of the axial movement of the rods 12, which tend to cause axial displacement of the actuating ring 10 to a greater extent than necessary, particularly owing to the non-deformability of the rods 12. On contrary, the deflection of the actuating ring 10 is zero or almost zero at the level of the driving means 14 that guides the actuating ring 10 in its displacement. Hence, it appears obvious that doubling the number of driving means 14, by placing the latter opposite each other, would be a solution to be considered for limiting the deflection of the actuating ring 10; however, use of two driving means 14 increases the weight of the turbine engine and above all increases the overall dimensions of the assembly 2.

In FIG. 3, the ring 10 in the so-called normal position, i.e. without deflection, is referenced 10a and the deflected ring 10 is referenced 10b.

Figure 5:
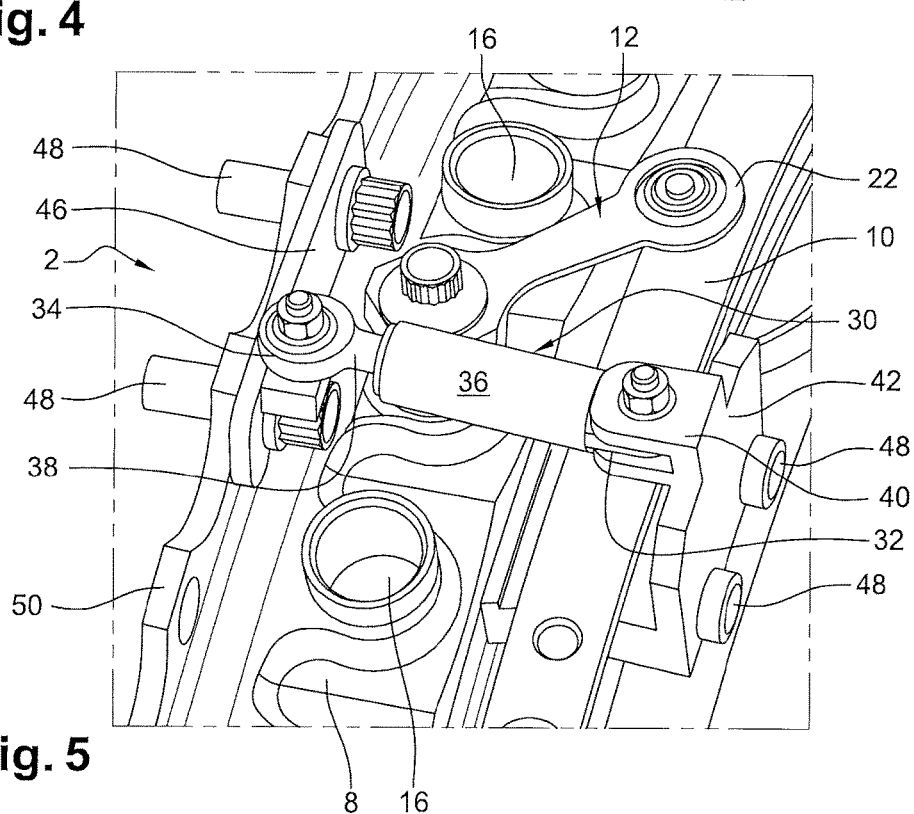
FIG. 5 is a simplified view of the assembly in FIG. 4 in which the vanes have been angularly pitched.

As can be seen in FIGS. 4 and 5, the assembly 2 comprises a slidingly connected element 30. As illustrated in the figures, the slidingly connected element 30 is in the present case a passive cylinder 30, hereinafter known as cylinder 30, the first end of which 32 is connected by a sliding pivoting link to the actuating ring 10 and a second end 34 is connected by a ball-joint link on the casing 8, around axes A2, A3 respectively, which are substantially radial, passing through the first end 32 and the second end 34 respectively. It should be understood that the axes A2, A3 are radial when the rods 12 are substantially parallel to the axis A of the turbine engine 6.

Passive means that the cylinder 30 is not governed or controlled.

The cylinder 30 is in this case circumferentially opposite the driving means 14 in order to limit deflection of the actuating ring 10 as will be seen below. This cylinder 30 subsequently serves to limit the axial deflection of the actuating ring 10 on the casing 8 to the axial displacement induced by the actuator 28, i.e. the driving cylinder. When the actuating ring 10 is driven in rotation, any deflection is counteracted by the translational displacement of the pin 38 in the body 36 of the cylinder 30 such that the deflection is halted. The cylinder 30 comprises a body 36 bearing the first end 32 and in which a pin 38 bearing the second end 34 is mounted for translational movement.

Figure 6:
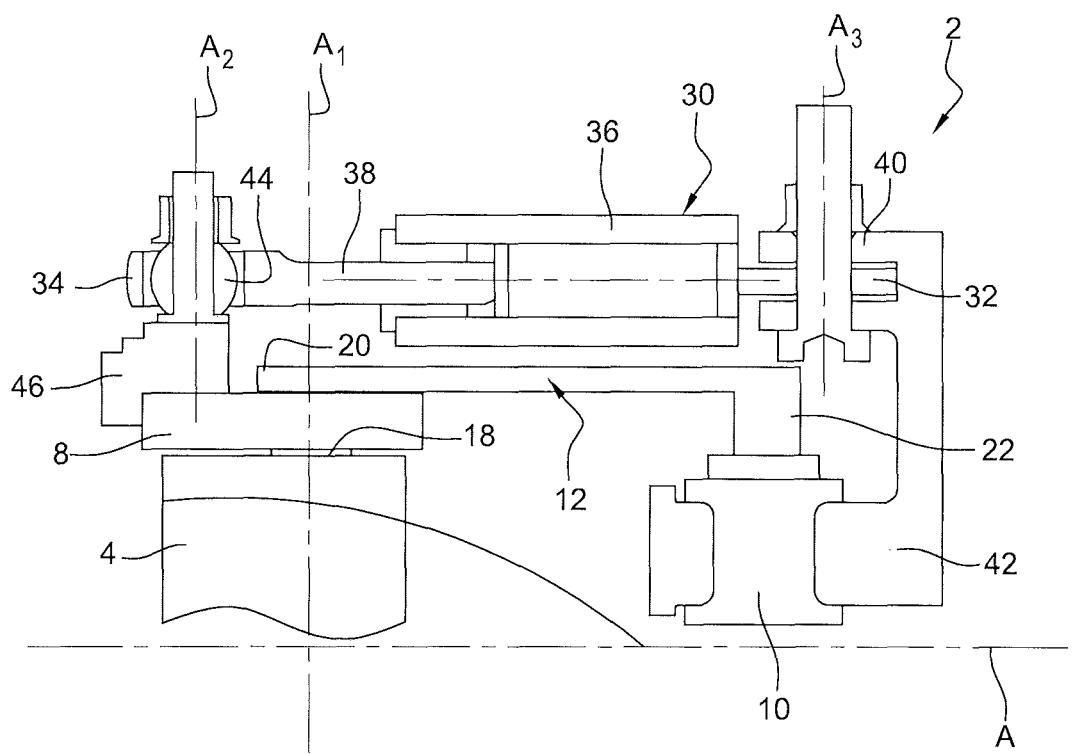
FIG. 6 is a diagrammatic sectional view representing the cylinder of the assembly in FIGS. 4 and 5.

As can be seen in further detail in FIG. 6, the first end 32 of the cylinder 30 is mounted in a sliding pivoting link in a yoke 40 of a first support element 42 integral with the actuating ring 10 and the second end 34 of the cylinder 30 is connected by a ball-joint link 44 to a second support element 46 integral with the casing 8.

The ball-joint link 44 allows the cylinder 30 to follow the movement of the actuating ring 10. Indeed, given that the cylinder 30 is integral with the actuating ring 10 at a fixed point, the path of the first end 32 of the cylinder 30 is a combination of a translational movement T along the longitudinal axis A and a rotational movement around the longitudinal axis A. The ball-joint link 44 thereby makes it possible to avoid any hyperstatism of the cylinder 30, which would be detrimental to its functioning and might cause its breakage in a worst-case scenario.

Advantageously, the first support element 42 is arranged axially downstream (or upstream respectively) from the rods 12 and the second support element 46 is arranged upstream (or downstream respectively) from the rods 12. It should be explained that axially means in an axial direction, i.e. along the longitudinal axis A.

Such an arrangement allows in particular a gain in compactness of the assembly 2 and a gain in weight, since the cylinder 30 is passive, therefore simpler in terms of design and production and of lower weight than a controlled cylinder.

The support elements 42, 46 are separate parts on the casing 8 and the actuating ring 10 and are secured in particular by means of bolts 48, i.e. by a nut and screw assembly, by riveting or by welding for example.

Advantageously, the second support element 46 is integral with a flange 50 of the casing 8.

Figure 7:
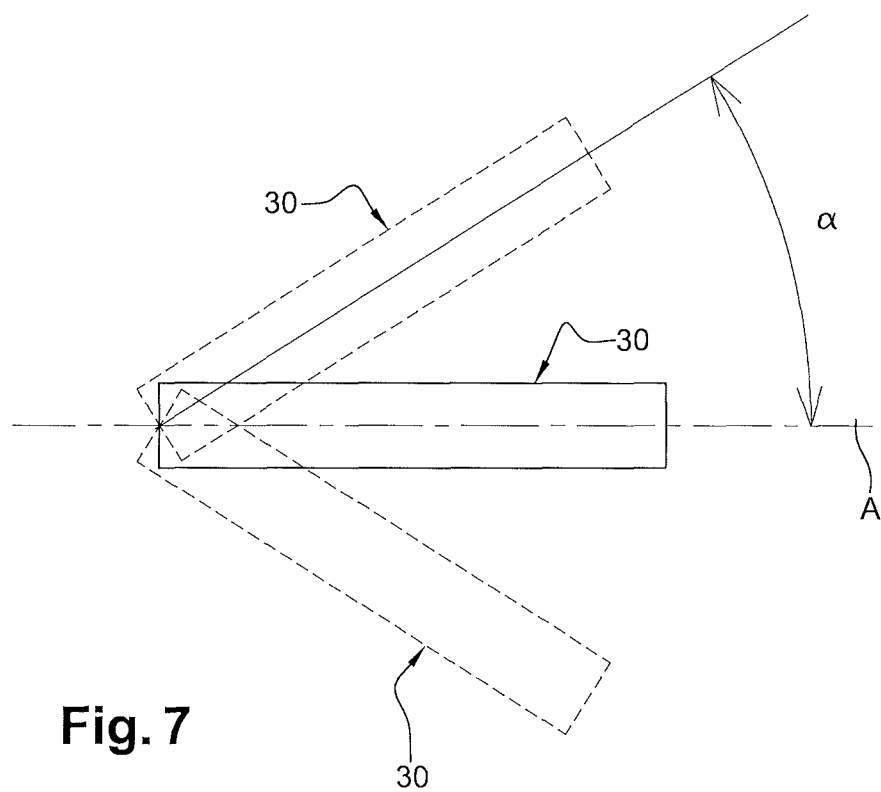
FIG. 7 is a diagrammatic view representing the cylinder in FIG. 4 in three different positions.

FIG. 7 shows, diagrammatically, the position of the passive cylinder 30 for a maximum spacing position of the actuating ring 10 in relation to the casing 8 and in dotted lines, two positions of the cylinder 30 for a minimum spacing position of said actuating ring 10.

When the actuating ring 10 is in the maximum spacing position, the vanes 4 are in an angular orientation suitable for the majority of phases of use of the turbine engine and the rods 12 are substantially parallel to the longitudinal axis 1. For some phases of use of the turbine engine, the vanes 4 need to have a specific orientation ranging to a maximum orientation in which the cylinder 30 of the assembly forms an angle α with the longitudinal axis A. The angular coverage of the cylinder 30 is therefore equal to 2×α, i.e. the displacement on each side of the longitudinal axis A. Preferably, α is between 30° in opening and +30° in closing.

It should be noted that in the majority of cases, the cylinder 30 is substantially parallel to the longitudinal axis A.

According to one aspect, the cylinder 30 is a gas braking cylinder or spring loaded braking cylinder inhibits the inwards and outwards movements of the pin 38 in the body 36 so as to limit deformation of the ring 10 when the latter is moved by the actuator 28. In the case of a spring-loaded cylinder, the tension of the spring will be selected accordingly in order to adjust the speed of movement of the pin 38 of the cylinder 30 in relation to the body 36, in order to allow axial displacement of the actuating ring 10 while controlling the latter. In contrast, in the case of a gas cylinder, it is the gas discharge valves of the body 36 of the cylinder 30 that will determine the speed of movement of the pin 38 in relation to the body 36.

During operation of the turbine engine, when the driving means 14 are activated, the actuator 28 causes the actuating ring 10 to rotate around the longitudinal axis A and the actuating ring 10 subsequently drives in turn the rods 12 that rotate the vanes 4.

In rotating around the axis A1 of the nuts 18 of the vanes 4, the rods 12 tend to move the actuating ring 10 uncontrollably in relation to the movement caused by the driving means 14. The cylinder 30 serves in this case to control the movement of the actuating ring 10 such that translation along the longitudinal axis A is substantially identical at all points of the actuating ring 10.

Hence, there is no deflection of the actuating ring 10 and therefore no risk of breakage of the actuating ring 10 nor any need for preventive or curative maintenance on the entire turbine engine 6.

Furthermore, use of a cylinder 30 makes it possible to limit the overall dimensions of the assembly 2 and therefore of the turbine engine 6 in relation to use of a second driving means 14 circumferentially opposite the first.

The invention claimed is:

1. An assembly for controlling variable pitch vanes in a turbine engine, the assembly comprising:
    an actuating ring surrounding a casing of the turbine engine and connected by rods to variable pitch vanes;
    driving means for rotating the actuating ring around the casing; and
    a passive element including a first end slidingly connected to a second end, wherein the first end of the passive element is connected by a sliding pivoting link on the actuating ring, and wherein the second end of the passive element is connected by a ball-joint link to the casing.

2. The assembly of claim 1, wherein the passive element is arranged circumferentially substantially opposite the driving means of the actuating ring.

3. The assembly of claim 1, wherein the passive element comprises a body bearing the first end and in which a pin bearing the second end is mounted for translational movement.

4. The assembly of claim 1, wherein the first end of the passive element is mounted for rotation and translational movement around and according to a radial axis in a yoke of a first support element integral with the actuating ring.

5. The assembly of claim 4, wherein the second end of the passive element is connected via the ball-joint link to a second support element integral with the casing.

6. The assembly of claim 5, wherein the first support element is arranged axially downstream, or upstream respectively, from the rods and the second support element is arranged upstream, or downstream respectively, from the rods.

7. The assembly of claim 1, wherein the second end of the passive element is connected via a flange of the casing.

8. The assembly of claim 1, wherein the passive element is a braking cylinder.

9. The assembly of claim 8, wherein the braking cylinder is a gas cylinder or a spring loaded cylinder.

10. A turbine engine comprising the assembly of claim 1.

11. The assembly of claim 1, wherein the first end comprises a body of a cylinder, and wherein the second end comprises a pin mounted in the body of the cylinder.

* * * * *